United States Patent
Renfrew

[11] 3,785,769
[45] Jan. 15, 1974

[54] POLYESTER FIBERS DYED WITH METHYLIDYNEBIS PYRAZOLONE DYESTUFFS

[75] Inventor: Edgar Earl Renfrew, Lock Haven, Pa.

[73] Assignee: American Aniline Products, Inc., Paterson, N.J.

[22] Filed: Mar. 10, 1972

[21] Appl. No.: 233,707

[52] U.S. Cl. ............. 8/179, 260/240 R, 260/240 F, 260/240.1
[51] Int. Cl. .............................................. D06p 3/54
[58] Field of Search ................... 8/179; 260/240 R, 260/240.1, 240 F

[56] References Cited
UNITED STATES PATENTS

| 2,840,443 | 6/1958 | Smith | 8/173 |
| 2,903,451 | 9/1959 | Smith | 260/240 R |
| 2,903,452 | 9/1959 | Smith | 260/240 F |

Primary Examiner—Leon D. Rosdol
Assistant Examiner—T. J. Herbert, Jr.
Attorney—Armstrong & Wegner

[57] ABSTRACT

Dyestuffs for polyester and plastic substrates are provided by reacting a methylidynebis pyrazolone with an N-methylolamide. The dyestuffs have the formula

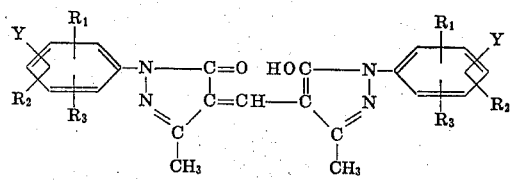

wherein
each of $R_1$, $R_2$ and $R_3$ is independently hydrogen, lower alkyl, chloro, bromo or lower alkoxy;

one Y is hydrogen and the other Y is

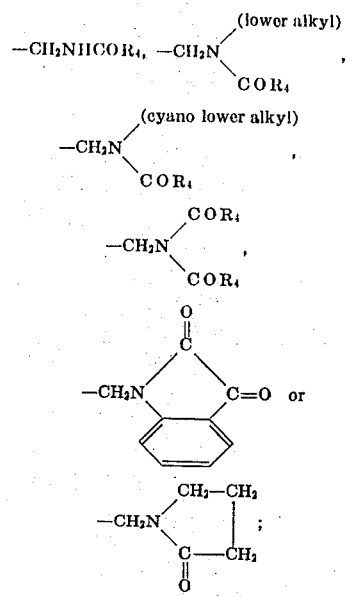

each $R_4$ is independently lower alkyl, chloro(lower alkyl), bromo(lower alkyl), cyano(lower alkyl), phenyl, chlorophenyl, bromophenyl, lower alkylphenyl, cyano(lower alkyl)phenyl, nitrophenyl, sulfamylphenyl, N,N-di(lower alkyl)sulfamylphenyl, N-(lower alkyl)sulfamylphenyl, lower alkylsulfonylphenyl, cyanophenyl, di(lower alkyl)carbamylphenyl or lower alkoxyphenyl; or the two $R_4$ groups taken together with the adjacent

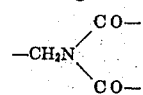

group form a heterocyclic group having five or six ring atoms.

3 Claims, No Drawings

POLYESTER FIBERS DYED WITH METHYLIDYNEBIS PYRAZOLONE DYESTUFFS

BACKGROUND OF THE INVENTION

Many compounds have been proposed over the years as dyes for synthetic fibers. With the emergence of the relatively newer synthetic fibers, such as polyethylene terephthalate, the search for dyes which are capable of coloring such newer synthetics has increased. Although much exploration has taken place in the azo and anthraquinone areas, comparatively little research has been conducted in the area of methylidynebis pyrazolones. Although Smith, in U.S. Pat. No. 2,840,443, reports certain methylidynebis pyrazolones, there has been a lack of successful research reported for more than a decade on related compounds.

SUMMARY OF THE INVENTION

According to a first aspect of the invention there are provided yellow polyester fabrics, wherein the yellow coloration of the polyester is attained through the dyeing of the polyester with a novel class of methylidynebis pyrazolones.

According to a second aspect of the invention there are provided plastic materials having a yellow coloration, wherein the yellow coloration is achieved with the inclusion of a novel methylidynebis pyrazolone.

According to a third aspect of the invention there is provided a novel class of dyestuffs of the formula

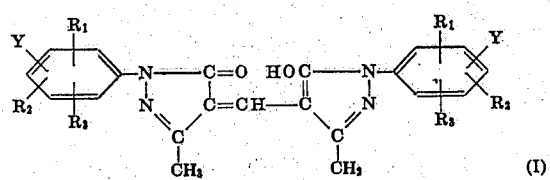

(I)

wherein
each of $R_1$, $R_2$ and $R_3$ is independently hydrogen, lower alkyl, chloro, bromo or lower alkoxy;
one Y is hydrogen and the other Y is

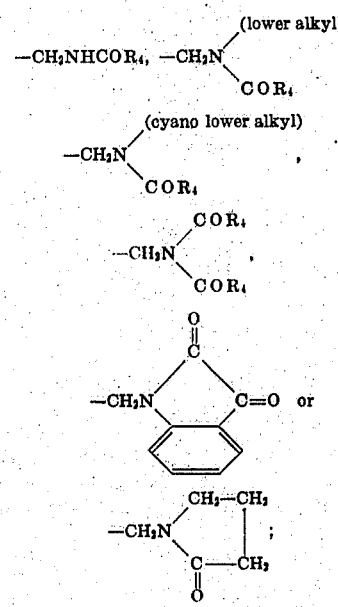

each $R_4$ is independently lower alkyl, chloro(lower alkyl), bromo(lower alkyl), cyano(lower alkyl), phenyl, chlorophenyl, bromophenyl, lower alkylphenyl, cyano(lower alkyl)phenyl, nitrophenyl, sulfamylphenyl, N,N-di(lower alkyl) sulfamylphenyl, N-(lower alkyl)sulfamylphenyl, lower alkylsulfonylphenyl, cyanophenyl, di(lower alkyl)carbamylphenyl or lower alkoxyphenyl; or
the two $R_4$ groups taken together with the adjacent

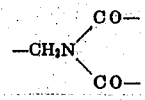

group form a heterocyclic group having five or six ring atoms.

DETAILED DESCRIPTION

The compounds of the invention (I) are produced via the reaction of an intermediate methylidynebis pyrazolone of the formula

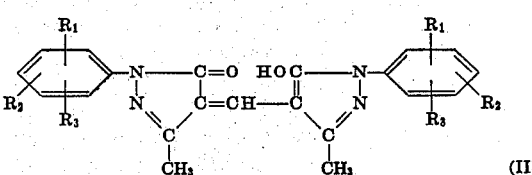

(II)

wherein $R_1$, $R_2$ and $R_3$ are as defined above, with an N-methylol compound

(III)

wherein Y is as defined above.

The intermediate methylidynebis pyrazolone (II) is readily prepared according to methods known in the prior art. Such prior art methods include the reaction between two molecular equivalents of 1-aryl-3-methyl-2-pyrazoline-5-one and one molecular equivalent of a methylidyne-donor linking agent such as formamide, orthoformic esters, or an acyloxydialkoxy-formal, or of chloroform and alkali [Ride, M., and S. Checchi, Gazz. chim. ital. 83 36 (1953).] The N-methylol compounds (III) are readily prepared by treating imides and amides with formaldehyde under controlled conditions. Thus, phthalimide on heating in water with an excess of paraformaldehyde yields N-hydroxymethylphthalimide in excellent yields. In the preparation of N-hydroxymethylamides, the reaction is often speeded by the addition of an alkali such as potassium carbonate.

Synthesis of the compounds of the invention may conveniently be carried out in accordance with the following procedure. Into 96 percent sulfuric acid at room temperature is added the intermediate methylidynebis pyrazolone (II). The N-methylol compound (III) is added incrementally thereto with external cooling to maintain the temperature below about 21°C. The reaction is allowed to continue with stirring, maintaining the temperature below about 25°C.

According to a preferred embodiment there are provided compounds of the invention Y is a group of the formula

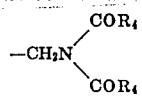

wherein the two $R_4$ groups together form a heterocyclic ring with the adjacent $-N(CO-)_2$ group. Preferred embodiments include: (1) ortho-arylene groups such as ortho-phenylene and its chloro, bromo, carbamyl and sulfamyl-substituted forms; (2) lower aliphatic groups of two to six carbon atoms containing two or three carbon atoms between the carbonyl groups which may be substituted by chloro, bromo or cyano. Examples are $-CH_2CH_2-$, $-CH(CH_3)CH_2-$, $-CHClCH_2-$, $-CH_2CH_2CH_2-$, $-CH_2CHBrCH_2-$, $-CH(CH_2CH_3)CH_2-$, $-CH\phantom{xx}CH-$, and $-CH=CHCH_2-$.

As used herein with reference to aliphatic moieties, the term "lower" constitutes the recognized lower members of the series, preferably containing not greater than six carbon atoms in a linear or branched aliphatic chain. For example, with reference to lower alkyl may be mentioned the groups methyl, ethyl, n-propyl, isopropyl, n-butyl, sec-butyl, tert-butyl and n-hexyl. According to a preferred embodiment, the lower aliphatic groups contain from one to four carbon atoms.

To prepare the product for application to the polyester substrates the product must be suitably dispersed. This may be done in any of several well-known methods, milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkyl-naphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye is preferably applied to the aromatic polyester fiber by thermofixation methods, such as the "Thermosol" process. This process involves padding the cloth with a dilute dye dispersion, followed by drying to remove water (e.g., by preheating with infrared heat) and curing by dry heat fixation using dried hot air or heated contact rolls. Curing or fixation temperatures of 350°–430°F are used for less than 2 minutes, usually for 30 to 90 seconds. Ordinarily, if the padded fabric is entirely polyester, curing is done at 400°–430°F. If the fabric contains cotton or viscose rayon, apart from synthetic fibers, there is little danger of damaging cellulosic portions, but if wool is present, the curing temperature must be kept below 357°F and the time must be reduced to about 30 seconds.

For durable press finishing of mixed polyester-cotton blends, after thermofixation the residual unfixed dye is removed from the fabric by scouring and the cleaned fabric is given a durable press cure at 300°–350°F. The new dyes of the invention show an excellent diffusion rate in the polyester fibers at the dyeing temperature and a low diffusion rate at the preferred press curing temperature of 300°–350°F.

The compounds of the invention may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrene-butadiene, are also within the scope of the invention.

Specific examples of thermoplastic resins include polyvinyl chloride, polyvinyl acetate, vinyl chloride-/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate, ethylene/ethyl methacrylate, ethylene/allyl alcohol, ethylene/allyl acetate, ethylene/allyl acetone, ethylene-/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus.

After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15 percent, preferably less than about 8 percent, by weight in relation to the rigid plastic substrate. An amount of colorant compound which has proved particularly valuable is about 0.0001 percent to about 1 percent.

The following examples serve to further illustrate the invention (the Y group in each example is attached to a phenyl nucleus):

EXAMPLE I

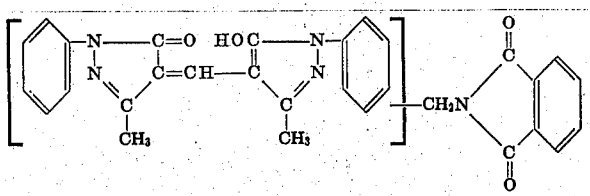

A 500 ml. three-necked flask is fitted with a stirrer, a thermometer, and a temperature controlling bath and is charged with 359 g. sulfuric acid, 96 percent. To this is added in small portions at 19°–21°C, 35.9 g. 4,4'-methylidynebis-3-methyl-1-phenylpyrazolidine-5-one, the temperature being maintained by slight external cooling. After one hour, there is added 18.7 g. N-hydroxy-methylphthalimide in small portions, with sufficient external cooling to maintain the internal temperature below 21°C. After the addition has been completed, the mixture is stirred for sixteen hours, during which time the temperature is allowed to rise to that of the surrounding, 25°C.

The mixture is drowned into 1,000 ml. ice water. The temperature is kept below 5°C by adding ice as needed.

The product separates in bright green-yellow flakes. It is collected on a filter, washed with water and dried.

EXAMPLE II

To a ball mill is charged 50 g. of the product of Example I, 25 parts of a commercially available ligninsulfonic acid salt marketed as a dispersing agent and 325 g. water. Milling is continued until the dispersion is satisfactory as shown by filter tests.

The disperse paste is applied to polyethylene terephthalate fabric by established dyeing methods (thermofix, carrier and pressure) and the dyed goods are subjected to the textile fabric tests developed and published by the American Association of Textile Chemists and Colorists. The dyed fabric is bright greenish-yellow in hue; the dyeing shows outstanding sublimation resistance at 200°C and light- and wash-fastness tests show excellent durability.

EXAMPLE III

Methyl methacrylate resin is colored with the compound of Example I as the colorant, in a ratio of 2 grams resin to 1 mg. colorant. The resin is prepared by placing 1 pound of methyl methacrylate into a Thropp mill (a two-roller mill), which is then heated and run in order to melt and smash the resin to a molten mass. The compound of Example I is added and the entire mixture of resin and colorant is milled until the colorant is uniformly distributed in the mass as measured by eye. While still hot, 30 grams of the hot mass is cut off for use in the following procedure. The sample, containing 30 grams methyl methacrylate and 15 mg. of the compound of Example I as colorant, may be conveniently molded in a Laboratory 40 Single Acting Watson-Stillman Laboratory Press (Farrell-Birmingham Co. 50-ton press). 30 grams of methyl methacrylate mixture containing 15 mg. of the compound of Example I per pound of methyl methacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, then the mold is closed.

The mold is held closed at zero pressure by releasing the hydraulic pressure and maintaining the steam for 5 minutes. The mold pressure is increased to 10 tons and held for 10 minutes, the steam remaining on.

The mold pressure is increased to 15 tons and the steam shut off; the drain is opened and cooling water is added for five minutes. Thereafter the pressure is changed to zero and the mold is opened to extract the resultant plastic chip.

EXAMPLE IV

When the 30 gram mixture of methyl methacrylate and the compound of Example I are replaced by 2 pounds polystyrene, 10.44 grams titanium dioxide and 227 mg. of the compound of Example I, following the procedure of Example II a fast coloration of the polystyrene is obtained.

EXAMPLE V

The compound of Example I may also be used as a colorant to impart a yellow shade to plastics made from polycarbonates. A pigmented plastic material of polycarbonates and the compound of Example I may be prepared according to the following procedure;

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions. 454 gms. Lexan 121-R (General Electric) pellets are placed in Bipel one ounce reciprocating screw injection molder. The pellets are tumbled for five minutes on the barrel tumbler. The resin is heated (front zone temperature of 550°F and rear zone temperature of 500°F) and chips are produced from the virgin resin until chips of good quality are obtained. When the desired quality of chips are obtained with the clear resin, a fresh batch of Lexan 121-R, containing the compound of Example I in an equivalent amount corresponding to Example III to produce a pigmented plastic material is fed into the injection molder, to produce yellow pigmented chips.

EXAMPLE VI

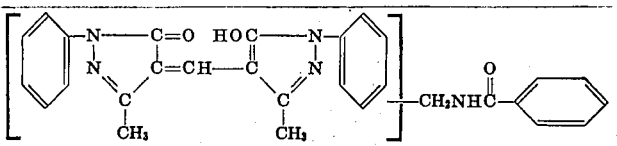

A dye of the indicated structure is made in the way described in Example I except that 16.0 g. N-hydroxymethylbenzamide is used in place of N-hydroxy-methylphthalimide.

The dye after dispersion similar to that of Example II is applied to polyethylene terephthalate and to cellulose triacetate. The hue on each fiber is bright greenish-yellow. Properties of the dyeings are excellent; sublimation is particularly good.

EXAMPLE VII

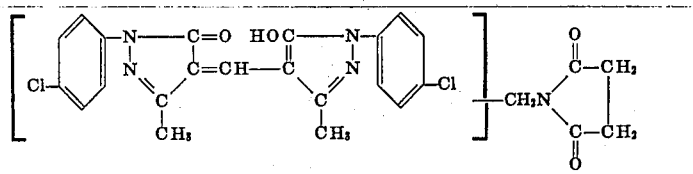

A dye of the indicated structure is prepared from 42.8 g. 4.4'-methylidynebis-3-methyl-1(4-chlorophenyl)pyrazolidine-5-one and 12.4 g. N-hydroxymethyl-succinimide by the method described in Example I.

The disperse dye so obtained dyes polyethylene terephthalate fabric in bright greenish-yellow shades of excellent fastness properties by following the procedure of Example II.

EXAMPLE VIII

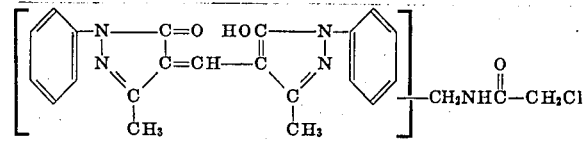

A dye of the indicated structure is prepared in the manner described in Example I, except that 13.6 g. of N-hydroxymethylchloroacetamide is used instead of N-hydroxymethylphthalimide.

The dye is similar in hue and properties to the product of Example VII.

EXAMPLE IX

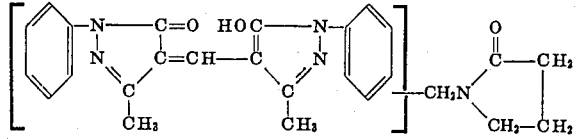

A compound of the indicated structure is prepared by the method described in Example I except that 10.9 g. 1-hydroxymethyl-2-pyrrolidinone is used instead of N-hydroxymethylphthalimide.

The material, after dispersion yields dyeings similar in hue and properties to the product of Example VII.

EXAMPLES X – XXXIX

Yellow dyeings on polyester are obtained from the products of these examples by applying suitably dispersed dyes by the conventional methods. The sublimation, light- and wash-fastness of the dyeings of these examples are excellent.

| Example | R₁ | R₂ | R₃ | Y |
|---|---|---|---|---|
| X | p-Cl | H | H | 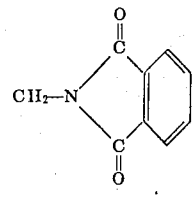 |
| XI | p-CH₃ | H | H | Same as above. |
| XII | 2-Cl | 4-Cl | H | Do. |
| XIII | o-OCH₃ | H | H | Do. |

| Example | $R_1$ | $R_2$ | $R_3$ | Y |
|---|---|---|---|---|
| XIV | p-$C_2H_5$ | H | H | Do. |
| XV | 2-$CH_3$ | 4-$CH_3$ | H | Do. |
| XVI | 2-Cl | 5-Cl | 4-$CH_3$ | Do. |
| XVII | p-Br | H | H | $CH_2-NHC(=O)-CH_3$ |
| XVIII | p-$CH_3$ | H | H | $CH_2NHC(=O)-CH_2Cl$ |
| XIX | H | H | H | $CH_2$-N(phthalimido, Cl-substituted) |
| XX | p-$CH_3$ | H | H | $CH_2-NHC(=O)-CH_2CH_2CN$ |
| XXI | o-Cl | H | H | $CH_2-NHC(=O)-C_6H_5$ |
| XXII | H | H | H | $CH_2$-N(succinimido) |
| XXIII | p-Cl | H | H | $CH_2NHC(=O)CH_2-C_6H_5$ |
| XXIV | H | H | H | $CH_2N(CH_3)-COCH_3$ |
| XXV | m-$CH_3$ | H | H | $CH_2-N(C_6H_5)-C(=O)-CH_3$ |
| XXVI | H | H | H | $CH_2-NHC(=O)-C_6H_4-4-Cl$ |
| XXVII | 2-$CH_3$ | 4-$CH_3$ | H | $CH_2-NHC(=O)-C_6H_4-4-CH_3$ |
| XXVIII | H | H | H | $CH_2-NHC(=O)-C_6H_4-4-NO_2$ |
| XXIX | o-$CH_3$ | H | H | $CH_2-NHC(=O)-C_6H_4-4-SO_2N(CH_3)_2$ |
| XXX | H | H | H | $CH_2-NHC(=O)-C_6H_4-4-Br$ |
| XXXI | H | H | H | $CH_2NHC(=O)-C_6H_4-4-SO_2CH_3$ |
| XXXII | H | H | H | $CH_2NHC(=O)-C_6H_4-4-OCH_3$ |
| XXXIII | p-($nC_4H_9$) | H | H | $CH_2$-N(phthalimido) |

| Example | $R_1$ | $R_2$ | $R_3$ | Y |
|---------|-------|-------|-------|---|
| XXXIV | H | H | | (structure) |
| XXXV | 2-CH₃ | 4-CH₃ | H | (structure) |
| XXXVI | H | H | H | (structure) |
| XXXVII | H | H | H | (structure) |
| XXXVIII | H | H | H | (structure) |
| XXXIX | H | H | H | (structure) |

EXAMPLE XL

Methyl methacrylate, polystyrene and polycarbonate are colored in yellowish hues when each plastic material is colored with the compounds of Example VI–XXXIX by using the procedure of Examples III–V, respectively.

What is claimed is:
1. Polyester dyed with a compound of the formula

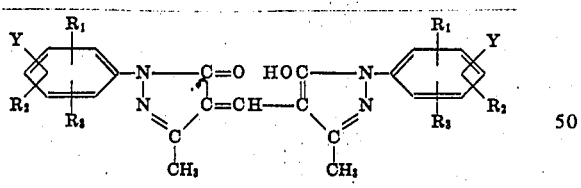

wherein
each of $R_1$, $R_2$ and $R_3$ is independently hydrogen, lower alkyl, chloro, bromo or lower alkoxy;
one Y is hydrogen and the other Y is —CH₂NHCOR₄, —CH₂N(lower alkyl)(COR₄), —CH₂N(cyano lower alkyl)(COR₄),

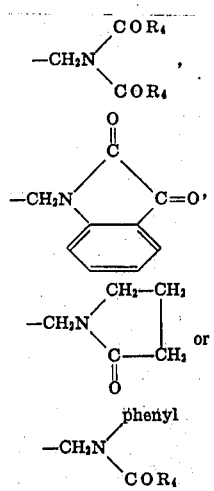

each $R_4$ is independently lower alkyl, chloro(lower alkyl), bromo(lower alkyl), cyano(lower alkyl), phenyl, chlorophenyl, bromophenyl, lower alkylphenyl, cyano(lower alkyl)phenyl, nitrophenyl, sulfamylphenyl, N,N-di(lower alkyl)sulfamylphenyl, N-(lower alkyl)sulfamylphenyl, lower alkylsulfonylphenyl, cyanophenyl, di(lower alkyl)carbamylphenyl, lower alkoxyphenyl or benzyl; or the two R₄ groups taken together with the adjacent
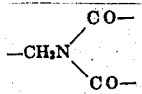
group form a heterocyclic group having five or six ring atoms.
2. Polyester of claim 1, wherein $R_1$, $R_2$ and $R_3$ are hydrogen.
3. Polyester of claim 2, wherein one Y is hydrogen and the other Y is of the formula
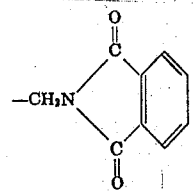
* * * * *